July 10, 1962 G. NELSON ET AL 3,043,642

SUSPENDED FURNITURE

Filed June 26, 1959 3 Sheets-Sheet 1

INVENTOR:
GEORGE NELSON
JOHN F. PILE

BY Price & Heneveld

ATTORNEYS

July 10, 1962 G. NELSON ET AL 3,043,642

SUSPENDED FURNITURE

Filed June 26, 1959 3 Sheets-Sheet 2

INVENTORS
GEORGE NELSON
JOHN F. PILE

BY Price & Heneveld

ATTORNEYS

INVENTORS
GEORGE NELSON
JOHN F. PILE
BY Price & Heneveld
ATTORNEYS

United States Patent Office 3,043,642
Patented July 10, 1962

3,043,642

SUSPENDED FURNITURE

George Nelson, Quogue, and John F. Pile, Brooklyn, N.Y., assignors to Herman Miller, Inc., a corporation of Michigan Filed June 26, 1959, Ser. No. 823,042
2 Claims. (Cl. 312—111)

This invention relates to a new means for providing service units in an office or other room. It is intended, among other things, to provide a unified system of storage and service units to replace conventional furniture.

Most offices or similar types of rooms require various types of storage and service facilities including, among other things, bookshelves, storage cabinets, file cabinets, and tables to support such miscellaneous items as telephone and intercommunication systems. In addition, other facilities may be provided for lighting fixtures. Heretofore, these various facilities have been provided through separate units of furniture, each of which is normally specialized to one purpose, such as a file cabinet, a bookshelf, a table or a storage cabinet. These units, normally, do not organize into a compact and readily accessible grouping and as such occupy a large area of a room. Furthermore, they are expensive and varying their capacity to meet the changing needs of an office is not readily accomplished. They occupy substantial floor space but frequently have a low vertical silhouette resulting in the necessity of making rooms larger than is necessary yet wasting substantial portions of the space between their tops and the ceiling. The cost of constructing office and similar enclosure facilities has become so high that it is imperative that the entire area of such enclosures be used efficiently without materially reducing the minimal spaciousness necessary to create a pleasant appearance and eliminate the impression of being cramped.

One solution that has been offered to this problem is the so-called built-in facility. In this case, the walls are constructed to have dual purpose. They serve as partitions and also as built-in storage facilities. While this reduces necessary floor space actually devoted to the enclosure or room itself and it does give to these facilities a marked degree of organization, the result is a static system. By static is meant a high degree of permanency. The construction of such permanent built-in facilities is exceedingly expensive and the cost of modification from time to time to meet the changing requirements of the rooms with which the facilities are associated becomes prohibitively expensive. From time to time it becomes necessary to vary the size and facilities of individual rooms to adapt them more appropriately to changing uses. This invention is designed to overcome these difficulties.

This invention provides all or substantially all of the facilities required of an office in an organized grouping. The particular choice of facilities which the invention provides for each office may be quickly and simply determined at the time of installation and thereafter may be varied to meet the changed requirements of the office with a minimum of time and expense. The total quantity of facilities provided may be increased or decreased as demand fluctuates. Further, these facilities may be used to divide a large area into a number of smaller working areas with the facilities being readily movable from time to time as it is necessary to enlarge or decrease or change the shape of individual ones of the working areas. The invention completely eliminates the necessity of any permanent built-in partitions or service facilities. This overcomes the high cost of room modification.

Those acquainted with the design and construction of office and like facilities will immediately understand the objects and purposes of this invention upon reading the following specification and the accompanying drawings.

Figure 1:
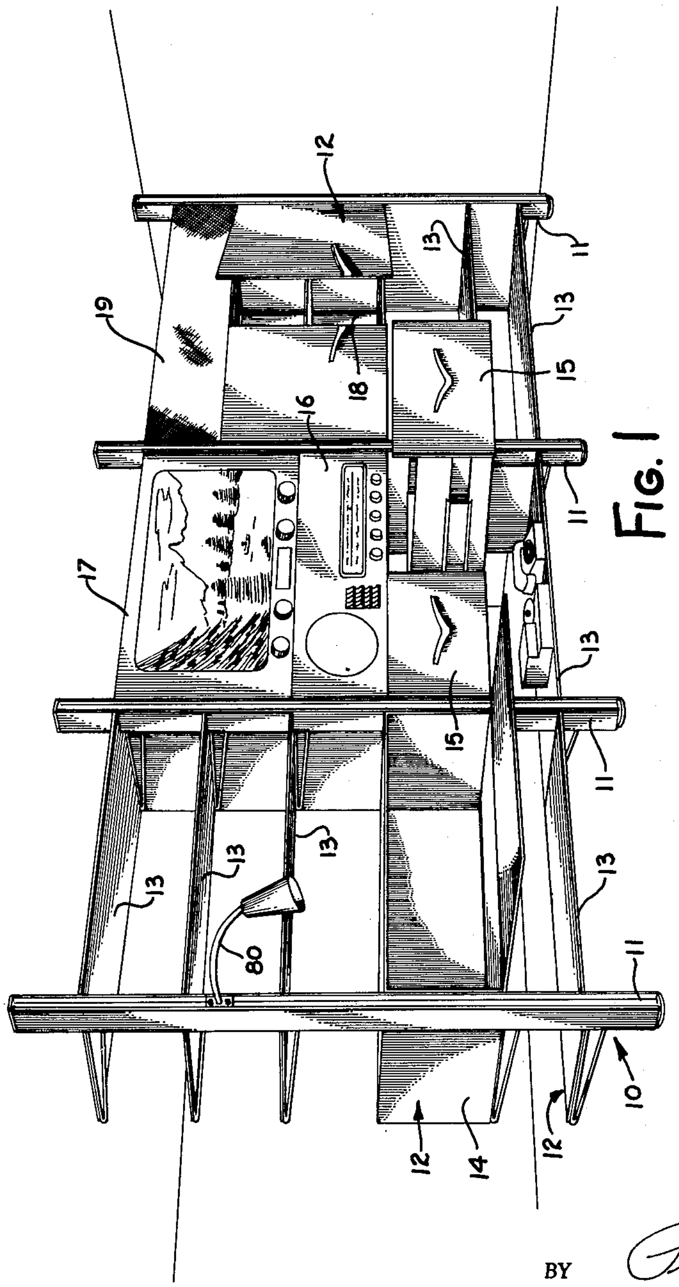
FIG. 1 is an oblique view of a combination space divider and storage facility constructed according to this invention.

In executing the objects and purposes of this invention, there has been provided a plurality of posts which may extend floor to ceiling or be free-standing from the floor. Between these posts are mounted a plurality of service units. These service units provide a variety of types of service such as shelf space, drawer space, table space, and can even provide desk space. These service units are hung from posts and preferably they are suspended above the floor so that all areas of the floor are free for cleaning. These service units are arranged in tiers between the posts. The order in which they are arranged vertically may be determined at the time of installation and subsequently varied at will. The various service units are readily detachable from the posts for replacement and substitution or for vertical adjustment from time to time according to the needs of the particular area being serviced. Further, the number of posts may be increased or decreased as the demand for service units changes from time to time. The posts are made readily detachable so that the entire service facility may be relocated within the area when desired.

Referring specifically to the drawings, the numeral 10 refers to a storage and service facility having a plurality of vertical posts 11. These posts are horizontally spaced preferably at equal distances from each other, although this is not necessarily so in the practice of this invention. Between each of the posts and arranged in vertical tiers are service units 12. All the service units 12 may be identical or, as illustrated, they may be of a wide variety of types and purposes.

For purposes of illustration, the service units 12 include shelves 13, a desk unit 14, file drawers 15, a service panel 16, a television receiver 17, and a storage cabinet 18. Where no service unit is provided, a cover or dress panel 19 may be used to present a neat and attractive appearance. The dress panel may be of any suitable material such as a piece of pressboard or plywood, painted or otherwise surface finished for purposes of ornamentation.

The size, number and type of service units employed is determined by the particular use to which the facility is going to be put. Further, as the use to which the facility is put varies from time to time, the type and number of service units may be varied accordingly. As will be explained in greater detail later, the amount of space allotted to each service facility may be varied to exactly tailor it to the demands of its environment.

Figure 5:
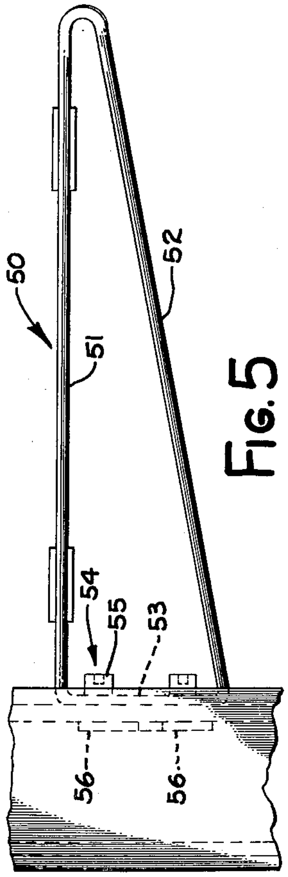
FIG. 5 is an enlarged fragmentary side elevation view of one of the hanger brackets used for mounting the service units on the posts of this invention.
Figure 6:
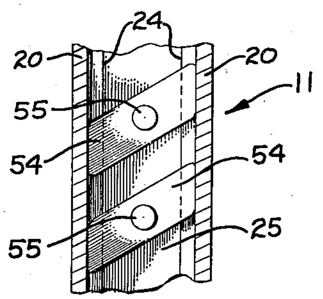
FIG. 6 is a fragmentary sectional elevational view taken along the plane VI—VI of FIG. 4.
Figure 4:
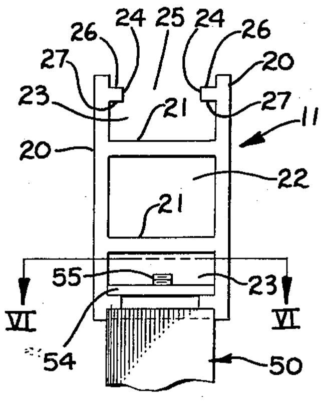
FIG. 4 is an enlarged sectional view of one of the supporting posts used in this invention.

The posts 11 constitute the entire support for all the service units 12. These of course may be of various types. As illustrated in FIGS. 4, 5 and 6, the posts 11, in cross section, are generally rectangular with their greatest dimension extending normal to the general plane of the service facility 10. The longer sides of the posts are defined by a pair of parallel side walls 20 joined by a pair of spaced, transverse webs 21. The webs 21 form a central tubular section 22 flanked on each side by a deep pocket 23. The pockets 23 open through opposite faces of the posts.

Each of the pockets 23 is characterized by a pair of aligned inwardly extending flanges 24. The flanges are spaced apart transversely of the post creating a slot 25. The flanges are inset a short distance from the open faces of the pockets creating both an outer shoulder or seat 26 and an inner shoulder or seat 27 on opposite sides of the pocket.

Figure 9:
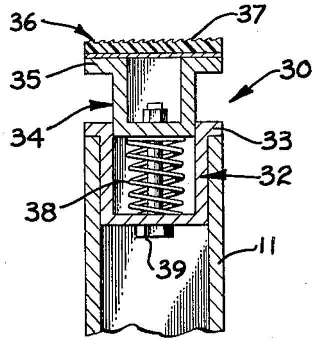
FIG. 9 is a fragmentary sectional elevation view of the top end of one of the supporting posts.
Figure 10:
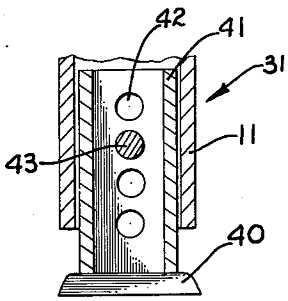
FIG. 10 is a fragmentary sectional elevation view of the bottom end of one of the posts.

The posts each have a ceiling clamp 30 (FIG. 9) and a foot assembly 31 (FIG. 10). The ceiling clamp includes a saddle bracket 32 which telescopes down into the central tubular section 22, its telescoping movement being limited by the laterally projecting top flanges 33. Where a larger and heavier type of ceiling clamp is required, the webs 21 may be removed adjacent the top end of the post, permitting the clamp to occupy the entire central area of the post. Telescopically received into the saddle bracket 32 is a generally U-shaped header bracket 34 having outwardly projecting flanges 35. A cap plate 36 extends between and is firmly secured to the flanges 35. The upper surface of the cap plate 36 is preferably covered with a pad 37 of material characterized by the high co-efficient of friction, as for example, a rough surfaced rubber pad.

Between the saddle bracket 32 and the header bracket 34 is a compressed coil spring 38 urging the brackets apart. Separation of the brackets is limited by the assembly bolt 39, the shank portion of which is free to slide through openings in one or both of the brackets.

The foot assembly 31 has a foot piece or disk 40 secured to the end of a leg piece 41. The leg piece 41 telescopes into the central tubular section 22 of the post. The leg piece 41 may be solid or tubular and is characterized by a plurality of transverse horizontal holes 42. The holes 42 are spaced vertically at short intervals and at selected positions of the foot piece each will align with an opening in the post 11. This opening may extend parallel or normal to the sides 20 of the post. Preferably, it is normal to the sides 20 to facilitate concealment of the anchor pin 43 which locks the foot piece 31 to the post 11. The use of the several holes 42 permits the effective length of the post 11 to be adjusted at point of installation for small variations in floor to ceiling spacing. The spring adjustment of the ceiling clamp accomplishes the vernier length adjustment between the holes 42.

The several service units 12 are secured to the posts 11 and supported by brackets 50 (FIG. 5). The brackets 50 are of generally triangular shape, each having a support arm 51, brace arm 52 and vertical leg 53. The vertical leg 53 is designed to seat in the shallow channel created by the ends of the sides 20 and the flanges 24 of the posts 11. Its width is such that it fits closely within this channel and abuts against the outer seats 26. It is secured to the post by fasteners 54, each including a cap screw 55 and a plate nut 56. The plate nuts are elongated having a narrow width such that when aligned with the slots 25 they will pass through it. Upon turning the cap screw 55 to tighten it, the plate nut in the seats 27 will wedge behind the flanges 24, drawing the bracket tightly against the post. As many of the fasteners 54 may be used for each bracket as are required for firm, positive support. It will be seen that the brackets may be secured at any point lengthwise of the post, and their vertical position may be adjusted from time to time as required. The brackets may be secured to either the front or rear faces of the post or both.

Figure 8:
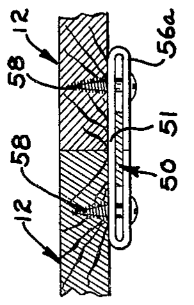
FIG. 8 is a fragmentary sectional elevation view of a modified attachment clip used on the hanger bracket.
Figure 7:
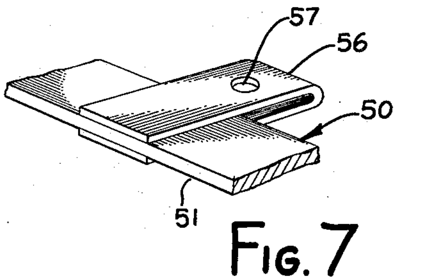
FIG. 7 is a fragmentary oblique view of one of the attachment clips used on the hanger bracket.

For the purpose of securing the service units 12 to the brackets 50, attachment clips 56 are affixed to the support arms 51 of each bracket by any suitable means such as welding. Where the service unit extends to one side only of the bracket, the attachment clip 56 likewise projects only to one side (FIG. 7). Where, however, two service units are joined at a bracket, the attachment clip 56*a* is centered on the bracket 50 (FIG. 8). The attachment clips 56 have one or more holes 57 for fasteners such as screws 58 by which the service units are secured.

Figure 11:
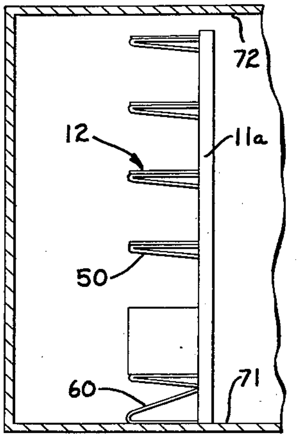
FIG. 11 is a somewhat schematic end elevation view of a modified post structure for this invention.

While the posts 11 have been described as extending from floor to ceiling, it is also possible to make them entirely free-standing, eliminating all contact with the ceiling (FIG. 11). In this case a floor bracket 60 is secured to the lower end of the post 11*a* in the same manner as the brackets 50. If the service units 12 project only from one face of the posts 11*a*, a single floor bracket 60 is used for each post. If the service units are centered fore and aft of the posts 11*a*, it may be preferable to use two of the floor brackets 60, one on each side of the post. In either case, the lateral silhouette of the floor brackets should not extend beyond the lateral silhouette of the service units 12. Where the floor brackets 60 are used, they are suitably anchored to the floor to stabilize the service facility 10.

Figure 12:
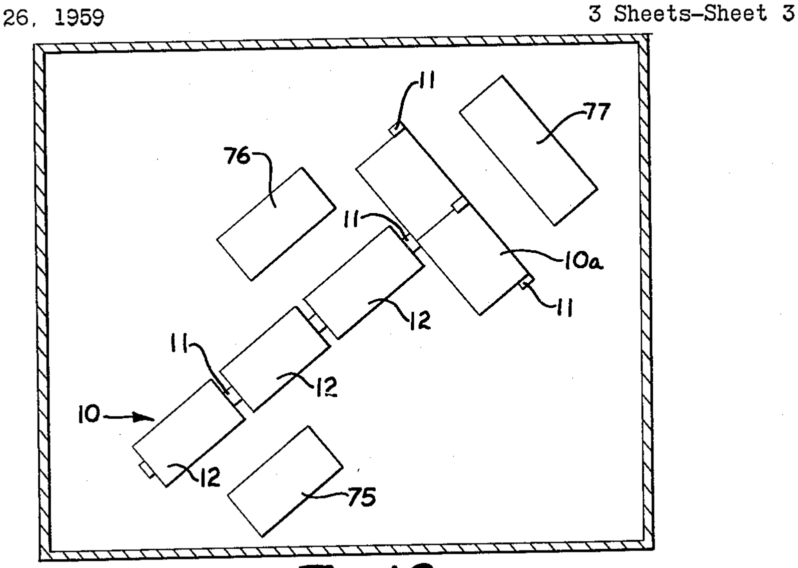
FIG. 12 is a schematic layout of a room divided by means of this invention into several working areas.
Figure 13:
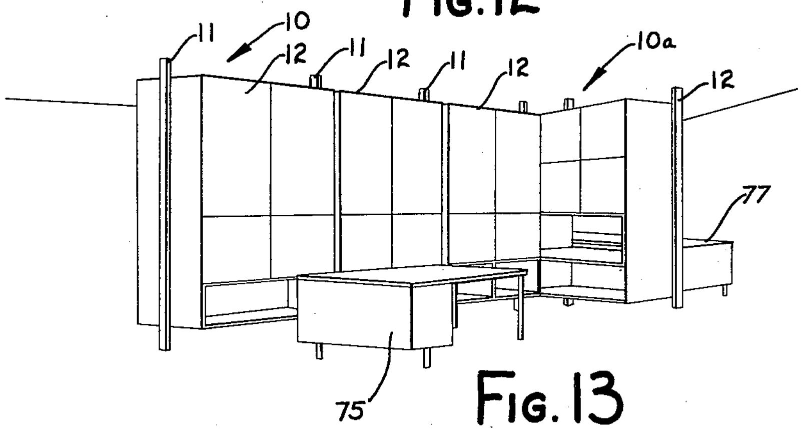
FIG. 13 is an oblique view of the facilities schematically illustrated in FIG. 12.

FIGS. 12 and 13 illustrate the application of this intion. The service facility 10 consisting of supporting posts 11 and service units 12 are located in the room or work area in a manner to utilize the available space most effectively. Thus, it may be placed anywhere in the room where it will work most efficiently in connection with the use which is to be made of the room. This is possible since the units requires no attachment to a wall. It requires for support only a floor or floor and ceiling. Thus, it is entirely mobile and is the direct opposite of conventional built-in wall facilities.

Further, it makes use of space wasted by conventional facilities since being a floor to ceiling facility, with the location type and height of the individual service units 12 selectable and variable at the point of erection, the individual tiers of service facilities may be made as high as practical within the limitations imposed by the ceiling. From time to time, as operating circumstances change, one or more of the posts 11 and adjoining tiers of service units 12 may be added, removed or relocated.

Figure 2:
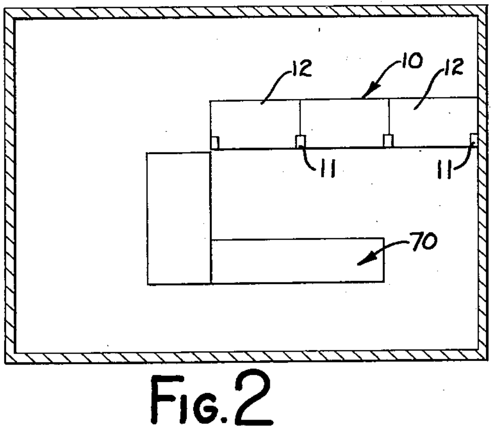
FIG. 2 is a plan view of an office facility utilizing the construction illustrated in FIG. 1.
Figure 3:
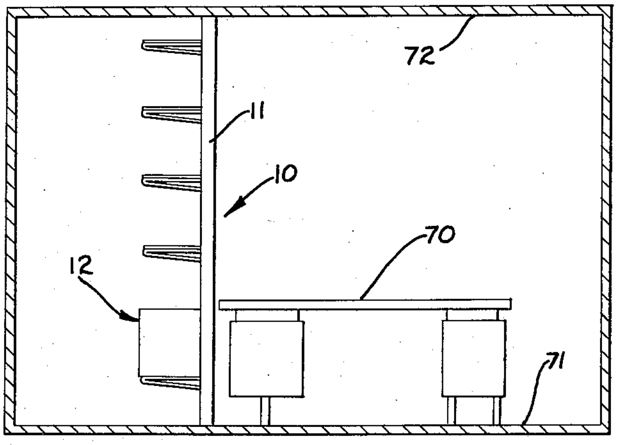
FIG. 3 is an end view of the construction illustrated in FIG. 2.

The invention may be used as simply a combined service unit and space divider or it may be used as a complete service unit in conjunction with a desk 70 as suggested in FIGS. 2 and 3. The unit is free-standing with respect to the desk, being supported solely by the floor 71 and ceiling 72 or, in the case of the construction shown in FIG. 11, by the floor 71 alone. The unit lends itself to use as a combined service or storage facility and space divider serving several desks or other types of work centers simultaneously.

FIGS. 12 and 13 illustrate such an arrangement. Here one portion of the service facility 10 cooperates with the desk 75 while another portion cooperates with the desk 76. At the same time the service facility 10 serves as a space divider to provide a high degree of separation or privacy for the desks 75 and 76. At one end a secondary service facility 10*a* is installed extending crosswise of the main service facility 10. The secondary service facility cooperates with the desk 77 and also gives it a high degree of privacy from both the desks 75 and 76. Because of the ease with which these service facilities may be modified, relocated and rearranged, their installation does not freeze or render static the space allocation or use.

It will be noted in this illustration that the tiers of service units 12 are centered fore and aft between the posts 11 while in the service unit 10*a* the service units are entirely at the rear of the posts. While space limitations and various other factors will dictate the choice between offset and centered service unit arrangements, it may be generally observed that the offset arrangement is preferable when the facility is located close and parallel to a wall while the balanced arrangement may be preferable when the unit is used as a space divider or allocation means.

Providing clearance from the floor is desirable. This permits the floor to be cleaned with a minimum of difficulty. Further, facilities at floor level are inconvenient and are frequently damaged by floor cleaning equipment or by being kicked.

Facilities such as lighting can be provided on the unit. As suggested by the lamp 80 (FIG. 1), lighting fixtures can be mounted to the posts 11 using the same basic type of attachment means employed for the brackets 50. Such fixtures can be readily moved from post to post and adjusted vertically. The electrical conductor for the fixture can be largely concealed by placing it in the opening pocket 23 of the post.

It will be seen from the above description that this invention provides a dual purpose storage and space separation or allocation means different in function and concept from any heretofore known. For the first time it renders such facilities readily movable as well as expandible and contractible so that the facility is always tailored to the existing requirements. It eliminates the prohibitive cost incident to changing conventional static or fixed facilities. Further, individual service units or components may be varied or substituted practically at will.

It will be understood that variations may be made in the precise means by which this invention is executed which variations incorporate its principles. Such variations or modifications are to be considered as included in the hereinafter appended claims unless these claims by their language expressly state otherwise.

We claim:

1. In a means of furnishing a room having walls, a floor and a ceiling, the combination comprising: a plurality of horizontally spaced vertical posts each having a front face and a rear face; each of said posts being rigidly secured in said vertical position and supported on the floor of a room; a plurality of service units arranged vertically in tiers between said posts; each of said posts having a pair of flanges projecting toward each other and extending lengthwise of the post forming a continuous slot lengthwise of said post; said flanges defining both an inner and an outer channel also extending lengthwise of the post; said outer channel opening through the rear face of said post; the sides of said post projecting rearwardly beyond said flanges; a plurality of brackets each having one end seated in the outer channel of one of said posts, and being movable vertically along said posts to any selected position; said one end of each of said brackets being nested between said rearwardly projecting sides and holding said bracket against movement laterally of said post; means extending from each of said brackets into the inner of said channels for locking said brackets to said posts in any selected position; all of said brackets projecting rearwardly from said posts; each of said service units being secured to a pair of said brackets rearwardly of said posts and extending between said posts to form the only means joining said posts together between the upper and lower extremities of said posts; the bottom one of the service units of each of said tiers being vertically spaced from said floor.

2. In a means of furnishing a room having walls, a floor and a ceiling, the combination comprising: a plurality of horizontally spaced vertical posts each having a front face and a rear face; each of said posts being rigidly secured in said vertical position and supported on the floor of a room; a plurality of service units arranged vertically in tiers between said posts; each of said posts having a pair of flanges projecting toward each other and extending lengthwise of the post forming a continuous slot lengthwise of said post; said flanges defining both an inner and outer channel also extending lengthwise of the post; said outer channel opening through one of the faces of said post; the sides of said post projecting outwardly beyond said flanges; a plurality of brackets each having one end seated in the outer channel of one of said posts, and being movable vertically along said posts to any selected position; said one end of each of said brackets being nested between said outwardly projecting sides and holding said bracket against movement laterally of said post and seated firmly against said flanges; means for locking said brackets to said posts in any selected position; each of said service units being secured to a pair of said brackets and extending between said posts to form the only means joining said posts together between the upper and lower extremities of said posts; the bottom one of the service units of each of said tiers being vertically spaced from said floor.

References Cited in the file of this patent

UNITED STATES PATENTS

| | | |
|---|---|---|
| 404,004 | Hovey | May 28, 1889 |
| 775,496 | Parsons | Nov. 22, 1904 |
| 891,968 | Allen | June 30, 1908 |
| 1,820,950 | Schulstadt | Sept. 1, 1931 |
| 2,345,650 | Attwood | Apr. 4, 1944 |
| 2,436,800 | Fryzel | Mar. 2, 1948 |
| 2,661,993 | Little | Dec. 8, 1953 |
| 2,691,502 | Jones | Oct. 12, 1954 |
| 2,744,714 | Parke | May 8, 1956 |
| 2,915,196 | Pira | Dec. 1, 1959 |

FOREIGN PATENTS

| | | |
|---|---|---|
| 12,623 | Switzerland | Aug. 13, 1896 |
| 429,863 | France | July 28, 1911 |